March 1, 1960  E. C. AULD, JR., ET AL  2,927,176
MAGNETIC SWITCH MECHANISM
Filed Jan. 6, 1955  3 Sheets-Sheet 1
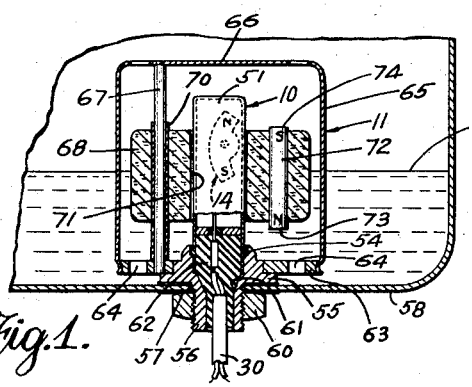
Fig. 1.
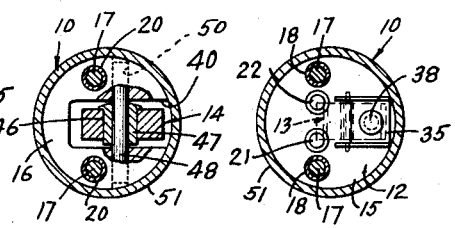
Fig. 5.  Fig. 6.
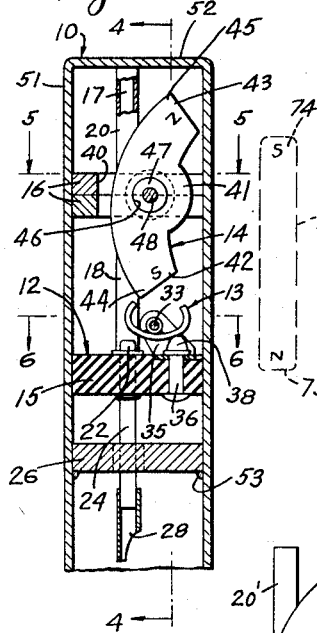
Fig. 2.
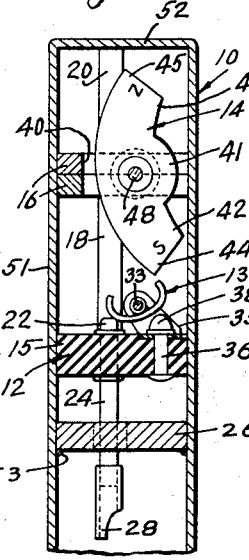
Fig. 3.
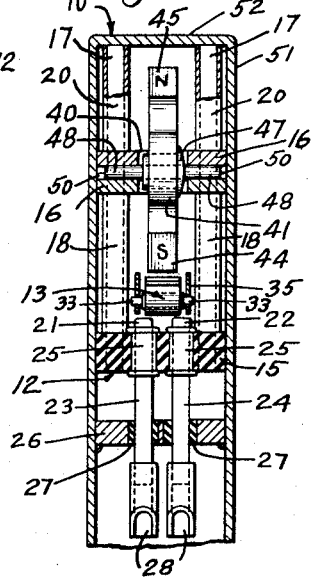
Fig. 4.
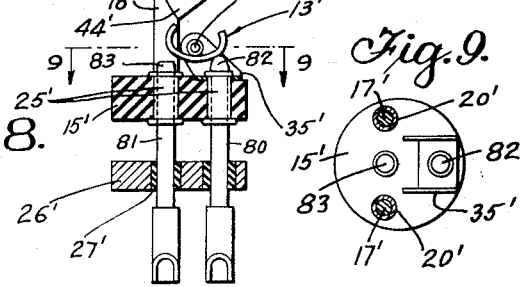
Fig. 8.  Fig. 9.
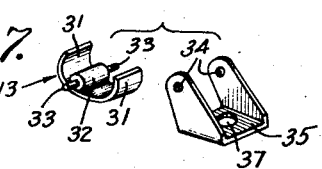
Fig. 7.
Edwin C. Auld Jr.
John H. Northrop
INVENTORS
BY
AGENT

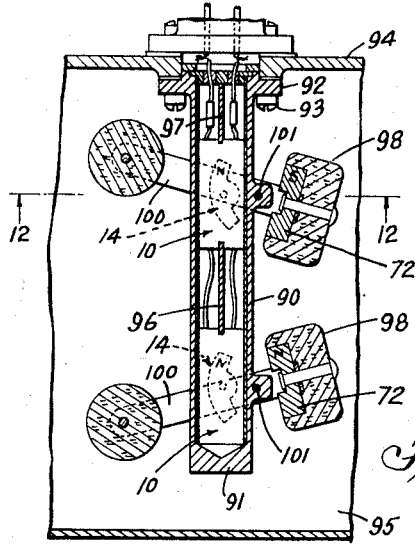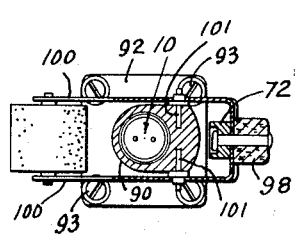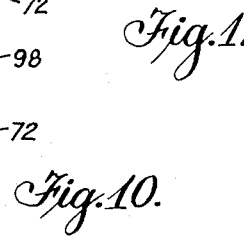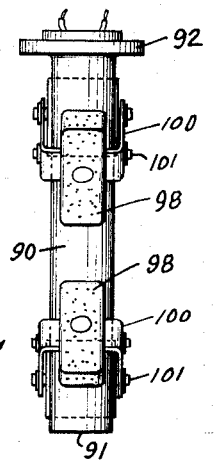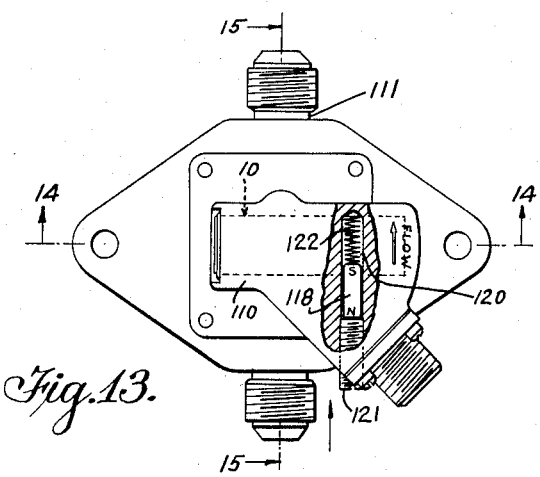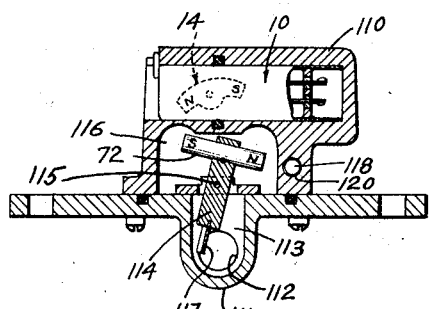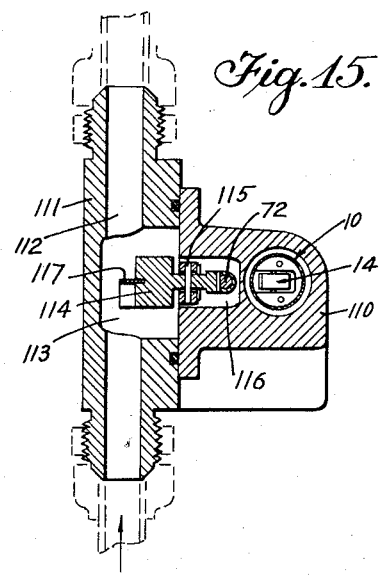

March 1, 1960 E. C. AULD, JR., ET AL 2,927,176
MAGNETIC SWITCH MECHANISM
Filed Jan. 6, 1955 3 Sheets-Sheet 3
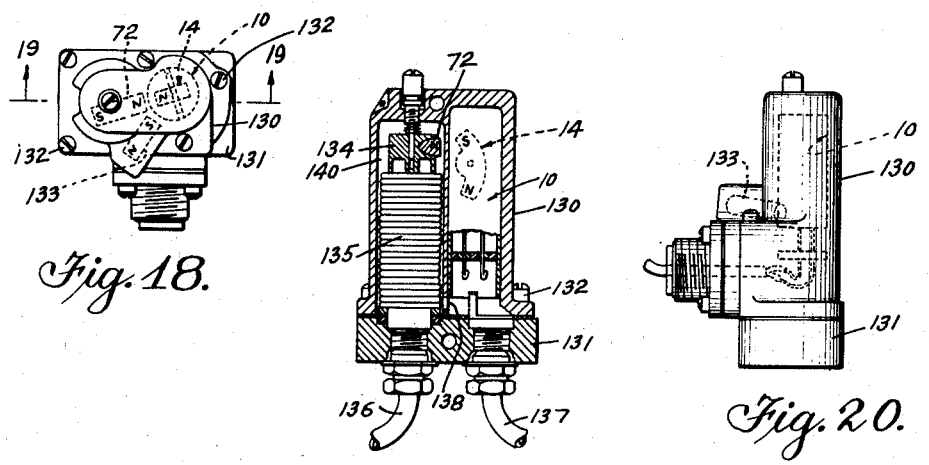
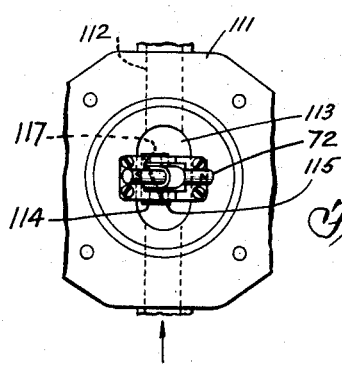
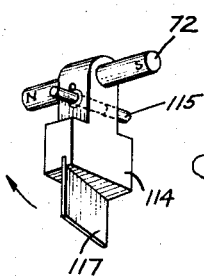
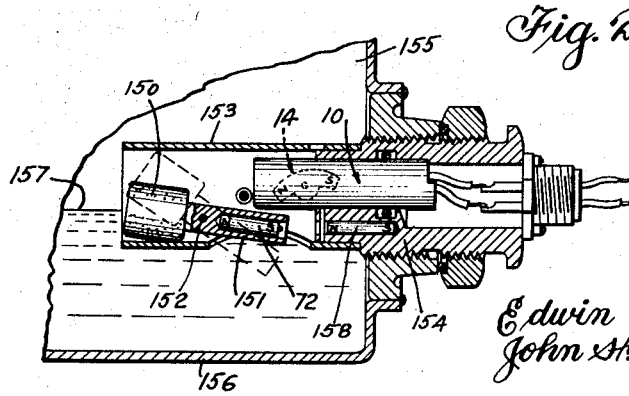
Edwin C. Auld Jr.
John H. Northrop
INVENTORS
BY
AGENT

United States Patent Office 2,927,176
Patented Mar. 1, 1960

2,927,176

MAGNETIC SWITCH MECHANISM

Edwin C. Auld, Jr., Duarte, and John H. Northrop, La Canada, Calif., assignors to Phillips Aviation Co., South Pasadena, Calif.

Application January 6, 1955, Serial No. 480,092

5 Claims. (Cl. 200—87)

The present invention relates generally to a magnetically operated switch mechanism and relates more specifically to such switch mechanisms which may be utilized in situations requiring placement of operating components in various types of liquid, gases or other corrosive or normally damaging medium.

Heretofore, many attempts have been made toward the provision of magnetically operated switch mechanisms; however, such prior like devices have had numerous disadvantages both in the operating characteristics thereof and from the standpoint of efficiency and reliability in operation. For example, when magnetically operated switch mechanisms are utilized in situations where placement thereof is necessary in undesirable mediums, considerable difficulty has been experienced in attempting to provide operating mechanism for the switch portion while still maintaining adequate protection against undesirable leakage such as might be experienced in connection with liquid filled compartments or the like. Additionally, when such switch mechanisms are utilized in, for example, inflammable liquids, any tendency for the switches to arc or create sparks must necessarily be eliminated thereby also eliminating a possible fire hazard.

When utilizing permanent magnets as a means for opening or closing electrical switch elements, it is necessary that such permanent magnets provide a sufficiently strong source of power in order that sufficient pressure may be applied to the switch element. In order to maintain efficient operating characteristics of magnetically operated switching devices over a considerable period of time, it is necessary that the magnets utilized therewith be of such a nature as to maintain their permeability over a considerable period of time. Any substantial loss in permeability of operating magnets necessarily reduces the effective force produced thereby and, accordingly, reduces the holding pressure applied between a switching member and suitable contacts. It has been found that such loss of permeability may be held to a minimum by employing relatively small permanent magnets; however, such employment of smaller permanent magnets increases the problem associated with the establishment of proper holding force or pressure between the electrical switching member and the contacts associated therewith. The present invention contemplates the provision of novel mechanism employed to accomplish the desired results and avoid the inadequacies experienced, as set out hereinbefore, with prior like arrangements.

Another problem often experienced in connection with magnetically operated switch mechanisms, is that of the effect of vibration on the operating components thereof. Accordingly it is desirable, and in some cases extremely necessary, that switching members utilized to open or close electrical contact points be maintained in either an open or a closed position without regard as to inadvertent or normal vibrationary movement of magnetic operating means. In order to accomplish this desired result, means must be provided effectively to lock and hold a switching member in one position or another until such time as the switching member is positively actuated toward a different position. Obviously, such locking or holding means must be effective in operation, simple in design, and be possessed of reliability over long periods of time. The present invention contemplates the provision of magnetically operated switch elements and permanent magnets employed and non-magnetically connected therewith wherein the effects of vibration are minimized and means are provided for locking or holding the switching elements in one position or another without employing heretofore known complex spring, lever or cam arrangements.

In addition to those set out hereinbefore, another important object of the present invention is to provide a capsulated magnetically operated switch mechanism that may be actuated by a variety of specific means and which may universally be adaptable for use with a wide variety of mechanisms employing electrical switch devices.

A further important object of the present invention is to provide a magnetically operated switch mechanism which may be hermetically sealed in a miniaturized condition in order not only to reduce the weight thereof, but to enable placement and use in confined situations.

Other and further important objects of the present invention will become apparent from the disclosures in the following detailed specification, appended claims and accompanying drawings, wherein:

Fig. 1 is a sectional view showing the switch mechanism of the present invention as employed with a float level indicator in a suitable liquid filled compartment;

Fig. 2 is an enlarged detail sectional view of the switch operating mechanism of the present invention;

Fig. 3 is a view similar to Fig. 2 showing parts in different positions;

Fig. 4 is a sectional view taken substantially as indicated by line 4—4, Fig. 2;

Fig. 5 is a transverse sectional view showing a means for mounting an actuating magnet in the present switch mechanism as taken substantially as indicated by line 5—5, Fig. 2;

Fig. 6 is a further transverse sectional view showing one form of contact arrangement employed with the present invention and as taken substantially as indicated by line 6—6, Fig. 2;

Fig. 7 is an exploded perspective view showing one type of contact arm arrangement for use with the present invention and a means for movably mounting such arm;

Fig. 8 is a fragmentary sectional view showing a modified form of contact arrangement which may be used with the present invention;

Fig. 9 is a sectional view showing the arrangement of the modified contacts as taken substantially as indicated by line 9—9, Fig. 8;

Fig. 10 is a sectional view showing the arrangement of a plurality of capsulated switch elements in another float level indicator;

Fig. 11 is a side elevational view of the float level indicator shown in Fig. 10;

Fig. 12 is an upwardly viewed sectional view as taken substantially as indicated by line 12—12, Fig. 10;

Fig. 13 is a plan view partially in section showing another installational situation for the switch operating mechanism of the present invention and showing a secondary means for controlling the operation of the switch mechanism;

Fig. 14 is a sectional view taken substantially as indicated by line 14—14, Fig. 13;

Fig. 15 is another sectional view taken substantially as indicated by line 15—15, Fig. 13;

Fig. 16 is a detail elevation view of a portion of the device shown in Fig. 13 and specifically showing the arrangement of one operating member for a control permanent magnet utilized with the present invention;

Fig. 17 is a perspective view of the control permanent magnet operating arrangement shown in Fig. 16;

Fig. 18 is an elevational view of a further installational situation for the switch operating mechanism of the present invention;

Fig. 19 is a sectional view through the modified arrangement shown in Fig. 18 as taken substantially as indicated by line 19—19, Fig. 18;

Fig. 20 is a side elevational view of the mechanism shown in Figs. 18 and 19; and Fig. 21 is a sectional view showing a still further modified installational arrangement for the switch operating mechanism of the present invention.

With reference to the drawings, the magnetic switch operating mechanism of the present invention is shown as indicated generally at 10 in Fig. 1, and adapted for use in connection with a float operated liquid level indicating device 11. The switch mechanism is shown in detail in Figs. 2 through 7 inclusive, which represent a typical embodiment of the present device which, with possible modifications, will be employed hereinafter in conjunction with various installational situations. While at least one additional modification will be illustrated and described, it is to be understood that many modifications of the device may be possible without departing from the spirit and scope of the present invention.

With reference now primarily to Figs. 2 through 7 inclusive, the switch mechanism 10 includes a support structure indicated generally at 12, a switch member 13, and an actuating permanent magnet 14. The support 12 includes a disc 15 of electrical non-conductive material and a bearing supporting member comprising adjacently disposed discs 16. The disc 15 and discs 16 are maintained in spaced relationship as by a pair of supporting rods 17 that extend from the disc 15 to a point above the discs 16. Spacers 18 and 20 surrounding the rods 17 serve to maintain the disc 15 and discs 16 in proper spaced relationship. The discs 16 are of non-magnetic responsive material such as, for example, aluminum or the like. As shown primarily in Fig. 4, a pair of contacts 21 and 22 are formed on inner ends of a pair of conductors 23 and 24. The conductors 23 and 24 extend through suitable grommets 25 arranged in the disc 15 and are secured therein as by soldering or the like. The conductors 23 and 24 further extend outwardly from the disc 15 and through a closure disc 26 that is arranged in spaced relationship to the disc 15 in a direction opposite from the discs 16. The conductors 23 and 24 are maintained in spaced relationship to the metallic portion of the disc 26 as by dielectric material 27 retained in suitable openings through the disc 26. The outer ends of the conductors 23 and 24 are fitted with suitable soldering fittings 28 so as to enable connection thereof to suitable electrical wiring as indicated at 30 in Fig. 1. The wiring 30 may extend to any suitable point for utilization in the control of any of a variety of types of electrically operated equipment or indicating lamps or the like.

The switch contact member 13 comprises a substantially U-shaped body portion having upwardly extending end portions 31, Fig. 7, with a bearing supporting portion 32 disposed in the central area thereof. Pins 33 extend laterally from the portion 32 and are adapted to be journaled in suitable openings 34 in a bracket member 35. The U-shaped bracket member 35 is adapted for connection to the disc 15 as by a rivet 36 which extends through a suitable opening 37 in the bracket member. One end of the rivet 36 is provided with an enlarged head portion 38 that is adapted for engagement with the contact member 13 when moved in one direction as shown in Fig. 2. When the contact member 13 is moved into another direction as shown in Fig. 3, contact will be made thereby with the contacts 21 and 22 thereby to bridge these contacts electrically to connect the conductors 23 and 24. The contact member 13 is made from a magnetically responsive material such as iron or the like for a purpose to be hereinafter more fully described.

As shown primarily in Fig. 5, the discs 16 are provided with a side opening cut out 40 in which the actuating permanent magnet 14 is disposed. The magnet 14 has a substantially semicircular configuration with an oppositely disposed arcuate central portion 41. End portions 42 and 43 are formed on an angle substantially equal to a radius of the semicircular magnet body thus defining pointed end portions 44 and 45. The end portions 44 and 45 are so arranged in order that the portion 44 will comprise the south pole and the portion 45 will comprise the north pole. The magnet 14 is provided with a central opening 46 in which a spacer member 47, Fig. 4, is disposed. The spacer member 47 has laterally disposed shafts 48 that are received in openings 50 formed between the discs 16 thereby pivotally to support the magnet 14.

Preferably, the various permanent magnets utilized in the present invention may be made from any suitable magnetic material such as, for example, "Alnico" which is a mixture of aluminum, nickel and cobalt and provides a high magnetic permeability material which retains such permeability over a considerable period of time.

With reference primarily to Figs. 2 and 3, it is to be noted that the actuating permanent magnet 14 has its end portion 44 maintained in spaced relationship to the upstanding end portions 31 of the contact member 13 at all positions of both the magnet and the contact member, the actuating forces of the magnet 14 being delivered to the member 13 through the non-mechanical magnetic linkage. By magnetic attraction between the end portion 44 of the actuating magnet 14 and the contact member 13 will maintain the magnet in the two positions shown in Figs. 2 and 3 respectively, it is to be noted that any inadvertent pivotal movement of the magnet 14 will be limited by contact with the inner surface of a casing or housing 51. The housing 51 has a closed end portion 52 and is adapted closely to surround the discs 15 and 16 and closure disc 26. The closure disc may further be fixed to the housing 51 as by soldering at 53 thus hermetically to seal the supporting structure 10 contact member 13 actuating magnet 14 and contacts 21 and 22 against the effect of contaminants that may surround the housing 51. The capsulated unit thus defined is not only unaffected by vibrational influences due to the magnetic attraction between the pole 44 of the magnet 14 and the portions 31 of the contact member 13, but is also sealed in such a manner as to prevent any sparking or arcing of the contacts 21 and 22 from affecting any material that may surround the housing 51. Furthermore, by positioning the pole 44 in close proximity to the contact member 13, considerable magnetic attraction is available thus creating a greater pressure of the contact member 13 with the contacts 21 and 22 and enabling a greater electrical load to be carried by the conductors 23 and 24 through the contacts 21 and 22.

With reference to Fig. 1, the capsulated magnetically operated switch mechanism 10 may be used with a variety of types of equipment such as, for example, the float operated liquid level indicating device 11. In this arrangement, the housing 51 of the switch mechanism 10 may be provided with an annular flange 54 adjacent the lower end thereof to enable attachment to the fitting 55. The fitting 55 has a threaded portion 56 that extends through an opening 57 in a wall of a compartment 58. A nut 60 threadably engages the portion 56 of the fitting 55 to hold the fitting in the wall of the compartment 58. The wire conductors 30 extend outwardly to the fitting 55 and the open end of the housing 51 together with an opening 61 in the fitting 55 may be filled with a suitable dielectric material 62 in order rigidly to encase the protruding ends of the conductors 23 and 24 and the wiring 30. A disc flange 63 extends radially outwardly from the fitting 55 and is provided with a plurality of through openings 64. The periphery of the flange 63 serves to support a perforated shield or housing 65 which has a top wall 66. A guide shaft 67 extends between the flange 63 and the top wall 66 of the housing 65 and a float member 68 is disposed thereabout. The float member 68 has an integral guide member 70 which surrounds the rod 67 thereby to limit vertical travel of the float 68. The float 68 is further provided with a central opening 71 which loosely surrounds the case 51 of the switch mechanism 10 and is further adapted to support and carry a control permanent magnet 72 having ends 73 and 74 which define north and south poles respectively. The magnet 72 is thus positioned for movement relative to the actuating permanent magnet 14 and on a line or path substantially parallel thereto.

As shown diagrammatically in Figs. 2 and 3, the control permanent magnet 72 is adapted to be moved as by the float member 68 from one position to another. It is to be noted that a considerable lag will be experienced in operating the actuating magnet 14 inasmuch as the control magnet 72 must move from the position shown in Fig. 2 to the position shown in Fig. 3 or the reverse thereof until actuation of the actuating magnet is accomplished. Thus, any slight movements of the control permanent magnet 72 will be ineffective to effect actuation of the actuating magnet 14. This particular arrangement enables the control permanent magnet to be placed in closer proximity to the actuating permanent magnet and enables use of a relatively small actuating magnet thus reducing the inertia thereof and permitting less loss of permeability thereof due to use. In this regard, it is further to be noted that the contact member 13 may also be made relatively small and light in order to provide a low inertia situation in connection therewith. In other words, it is to be noted that the arrangement of magnetic elements in the present device is such that the control magnet 72 must actually be thrown from one position to another before the actuating magnet will be moved thereby to move the contact member 13.

By utilizing the control and actuating magnets and by arranging the poles thereof in such a manner as to position opposite polarities opposite each other, considerable force is exerted along a natural flux path to enable actuation of the contact member 13. By varying the distance of the control magnet 72 relative to the actuating magnet 14, a greater differential in movement of the control magnet 72 may be had as may be desired in various installation situations. Additionally, it is to be noted that the actuating magnet 14 is completely balanced about the pivot members 48 in order thereby to reduce the effect of unbalance or frictional losses thereabout.

As the level of a liquid 75 contained within the container 58 changes, the control permanent magnet 72 will be moved by action of the float 68 along the rod 67 thereby to actuate the actuating magnet 14. By reason of the pointed end portions and specifically the portion 44 of the actuating magnet 14, the pole 44 will be maintained in position opposite the portions 31 of the switch member 13 and thereby held or locked in such position until movement of the control magnet 72 is experienced.

In Figs. 8 and 9 a modified form of the present device is shown wherein like parts are indicated by like single primed reference numerals. In this form of the invention the dielectric disc 15' and disc 16' are supported as by rods 17' and spacers 18' and 20'. The actuating permanent magnet 14' is pivotally mounted in the discs 16' as by shafts 48' with the south pole 44' thereof being maintained in space relationship to a contact member 13'. The contact member 13' is supported on a shaft 33' which is in turn carried by a bracket 35'. A pair of conductors 80 and 81 extend through suitable dielectric material 27' in the closure disc 26' and through grommets 25' in the disc 15'. One of the grommets 25' serves to retain the bracket 35' on the disc 15' with the conductor 80 extending therethrough. The conductor 81 extends through the other of the grommets 25' thus providing contacts 82 and 83. The conductors 80 and 81 may be secured in the grommets 85' as by soldering, or the like.

In the form of the invention shown in Figs. 8 and 9, the contacts 82 and 83 are bridged as by action of the contact member 13' contacting the contact 83 upon movement of the actuating permanent magnet 14'. Electrical current is carried from the contact 83 through the contact member 13', the shaft 33', bracket 35' and grommet 25' to the conductor 80 and contact 82 thereof. The form of the invention shown in this modification may be suitable for situations requiring a low electrical load and enables construction of the present device with few components than those disclosed with the form of the invention shown in Figs. 2 through 7 inclusive.

A modified installation situation for the switch operating mechanism of the present invention is shown in Figs. 10, 11 and 12. In this form of the invention, a pair of switch operating mechanisms 10 are positioned in space relationship within a tube 90. The tube 90 has a closed end 91 and is secured, as by a flange 92 and screws 93, to an upper wall 94 of a suitable compartment 95. The units 10 are held in space relationship within the tube 90 as by spacing members 96 and 97, and control permanent magnets 72 are carried by float members 98 arranged on outer ends of arms 100 which are, in turn, pivoted to the tube 90 as at 101. It is to be noted that the control magnet 72, arranged in association with the lowermost float 98, has the magnetic poles thereof arranged in complementary fashion with regard to the poles of the magnetic switch unit 10 associated therewith. Thus, with the floats in the position shown in these figures both of the switches controlled by the units 10 will be closed with the uppermost float 98 being utilized to establish a high level actuation of the switch mechanism and the lowermost float 98 being utilized to provide a low level actuation of the switch as may be desired for operation of a suitable indicating mechanism.

In Figs. 13 through 17 inclusive, a further modified arrangement of the invention is shown which primarily illustrates another installation of the magnetically operated switch mechanism 10 and alternative means for controlling movement of the control magnet 72 and associated movement of the actuating magnet 14.

In the form of the invention shown in Figs. 13 through 17 inclusive, the switch unit 10 is mounted in a body 110 of a suitable flow control valve having a secondary body portion 111. The body portion 111 has a through bore 112 therein which communicates with a central chamber 113. Fluid flow through the bore 112 will also be manifest in the chamber 113. In order to control operation of a control permanent magnet 72, an arm or lever 114 is pivoted as at 115 to the body portion 110 and extends into a secondary chamber 116. The portion of the lever 114 extending into the chamber 116 serves to support and carry the control magnet 72. The portion of the lever 114, extending into the chamber 113, carries a vane 117. A third permanent magnet, which may be termed a reset permanent magnet 118, is adjustably positioned in a bore 120 in the body 110, with the polarity thereof so arranged with respect to the polarity of the control permanent magnet 72 so as to bias the magnet 72 toward the position shown in Fig. 14, thereby maintaining the switch mechanism 10, by action of the actuating magnet 14, in an open condition. Upon establishment of fluid flow into the bore 112 and chamber 113, the vane 117 will serve to rotate the lever 114 about the pivot 115, thereby moving the control magnet 72 and causing actuation of the actuating magnet 14 thereby to close the switch control. The result of this action may be utilized to provide an indication as to the existence of fluid flow in the bore 112. Upon discontinuance of flow in the bore 112, the control magnet 72 will be returned to its initial position, as by action of the reset magnet 118. It is to be noted that the effective magnetic force of the reset magnet 118 is somewhat less than that of the actuating magnet 14 and that the position of the reset magnet 118, and effect thereof, may be changed as by an adjusting screw 121 and compression spring 122 arranged in opposite ends of the bore 120.

In Figs. 18, 19 and 20, a still further modified installation situation for the magnetically operated switch mechanism 10 is shown. In this instance, the unit 10 is utilized in conjunction with a differential pressure indicating arrangement including a block body 130 and a secondary body 131 secured together as by suitable screws or the like 132. The switch mechanism 10, through the actuating magnet 14, is biased toward an open position as by a reset magnet 133, while the control magnet 72, of a force greater than that of the reset magnet 133, tends to bias the switch 10 toward a closed position. The control magnet is carried by a carrier 134 which is in turn movable in response to action of a bellows 135. The interior of the bellows 135 is connected to one source of pressure through a conduit 136, while the exterior thereof is exposed to another pressure through a conduit 137 and an opening 138 into a chamber 140 in the body 130 and in which the bellows 135 is disposed. Movement of the bellows 135 in response to changes in the differential pressure thereabout will effect movement of the control magnet 72 and associated movement of the actuating magnet 14, thereby to cause actuation of the switch mechanism in the unit 10. The arrangement of the magnets 72, 133 and 14 is such as to enable movement of the actuating magnet 14 and the contact member with but very little movement of the bellows 135.

In Fig. 21, a further modified installation situation, for the magnetically operated switch mechanism 10, is provided. In this form of the invention, the mechanism 10 is utilized in connection with a low liquid level indicating arrangement wherein a float member 150 is mounted on the end of a lever 151 which is pivoted as at 152 to a tube member 153. The tube member 153 is mounted, by means of a fitting structure 154, to a compartment 155 and adjacent a lower wall 156 thereof. The level of liquid, as at 157, controls movement of the float 150. The lever 151, on the side opposite from the float 150, carries the control permanent magnet 72 which effects operation of the actuating magnet 14 in the usual manner described hereinbefore. When the liquid level 157 reaches a low point in the compartment 155, the float 150 will move downwardly from the dotted line to the solid line position thereby causing movement of the actuating magnet 14. When the float is moved to the dotted line position, the actuating magnet will be reset, as by a reset permanent magnet 158 disposed in the fitting body 154.

It may thus be seen that the magnetically operated switch mechanism 10 may be utilized in a variety of situations without modification thereof, thereby enabling mass production, lower cost and interchangeability of the units in these various installational situations. It is to be noted that, in all of the various installations, a continuous attraction is maintained by the control magnet 72 and the actuating magnet 14, thus to maintain continuous pressure upon electrical contacts. This situation remains, while still permitting actuation of the actuating magnet 14 upon movement of the control magnet 72 along a path substantially parallel to or in a rocking action inwardly or outwardly from the actuating magnet 14. It may also be seen that considerable differential movement of the switching mechanism may be experienced by placement of the control and actuating magnets at various distances from each other, and that a reset magnet may be employed, if desired, in some situations.

Having thus described the invention and the present embodiments thereof, it is desired to emphasize the fact that many modifications may be resorted to in a manner limited only by a just interpretation of the following claims.

We claim:

1. In a switch device, the combination of: a non-magnetically responsive housing; a support disposed at least partially in said housing and hermetically sealed therein; electrical contacts carried by said support and extending into said housing; a magnetically responsive switch member disposed in movable relationship on said support, in said housing and positioned selectively to bridge said contacts; end portions on said switch member, said portions extending in a direction away from said contacts; an actuating permanent magnet pivotally disposed on said support and within said housing, said magnet having pointed ends of a lower cross sectional area than a central area thereof, one of said pointed ends of said magnet being disposed in spaced relationship to said end portions of said switch member in all positions of said magnet and said switch member, said housing acting to limit pivotal movement of said magnet and establish alignment thereof with said end portions of said switch member; a control permanent magnet disposed exteriorly of said housing and movable along a path substantially parallel to a line through the poles of said actuating magnet; and means for moving said control magnet along said path, whereby to effect movement of said actuating magnet to positions with said one pointed end thereof adjacent one or the other of said end portions of said switch member thereby to magnetically move said member to bridge or break said contacts by said switch member.

2. In a switch device, the combination of: a non-magnetically responsive housing; a support disposed at least partially in said housing and hermetically sealed therein; electrical contacts carried by said support and extending into said housing; a magnetically responsive switch member disposed in movable relationship on said support and positioned selectively to bridge said contacts; end portions on said switch member, said portions extending in a direction away from said contacts; an actuating permanent magnet pivotally disposed on said support, said magnet having ends of a lower cross sectional area than a central area thereof, one of said ends of said magnet being disposed in spaced relationship to said end portions of said switch member in all positions of said magnet and said switch member, said housing acting to limit pivotal movement of said magnet and establish alignment thereof with said end portions of said switch member; a control permanent magnet disposed exteriorly of said housing and movable along a path substantially parallel to a line through the poles of said actuating magnet, said magnets having opposite polarity poles thereof disposed adjacent each other; and means for moving said control magnet along said path, whereby to effect movement of said actuating magnet to positions with said one end thereof adjacent one or the other of said end portions of said switch member thereby to magnetically move said member to bridge or break said contacts by said switch member.

3. A capsulated switch mechanism comprising, in combination: an elongated support; a pair of electrical contacts carried by said support; a magnetically responsive, U-shaped switch member pivotally mounted on said support and adapted for bridging said contacts; a generally semi-circular actuating permanent magnet disposed for pivoted movement on said support and on an axis substantially parallel to the mounting axis of said switch member; end portions on said switch member extending toward said magnet, said magnet having a first pointed end disposed in spaced relationship to said end portions in all positions of said magnet and said switch member, second pointed ends on said magnet being laterally positioned relative to poles of said magnet; a housing surrounding said support and elements carried thereby; a control permanent magnet disposed in spaced relationship to said second pointed ends of said actuating magnet; and float operated means for moving said control magnet along a path disposed rotated substantially ninety degrees to said axis of said actuating magnet, whereby to pivot said actuating magnet through effect of magnetic flux, between said magnets, and substantially simultaneously to move said switch member by magnetic attraction through said end portions to effect bridging or breaking of said contacts thereby.

4. A capsulated switch mechanism comprising, in combination: an elongated support; a pair of electrical contacts carried by said support; a magnetically responsive, U-shaped switch member pivotally mounted on said support and adapted for bridging said contacts; a generally semi-circular actuating permanent magnet disposed for pivoted movement on said support and on an axis substantially parallel to the mounting axis of said switch member; end portions on said switch member extending toward said magnet, said magnet having a first pointed end disposed in spaced relationship to said end portions in all positions of said magnet and said switch member, second pointed ends on said magnet being laterally positioned relative to poles of said magnet; a housing surrounding said support and elements carried thereby; a control permanent magnet disposed in spaced relationship to said second pointed ends of said actuating magnet, opposite magnetic poles of said magnets being disposed generally adjacent each other; and float operated means for moving said control magnet along a path disposed rotated substantially ninety degrees to said axis of said actuating magnet, whereby to pivot said actuating magnet through effect of magnetic flux between said magnets, and substantially simultaneously to move said switch member by magnetic attraction through said end portions to effect bridging or breaking of said contacts thereby.

5. A capsulated switch mechanism comprising, in combination: an elongated support; a pair of electrical contacts carried by said support; a magnetically responsive, U-shaped switch member pivotally mounted on said support and adapted for bridging said contacts; a generally semi-circular actuating permanent magnet disposed for pivoted movement on said support and on an axis substantially parallel to the mounting axis of said switch member; end portions on said switch member extending toward said magnet, said magnet having a first pointed end disposed in spaced relationship to said end portions in all positions of said magnet and said switch member, second pointed ends on said magnet being laterally positioned relative to poles of said magnet; a housing surrounding said support and elements carried thereby, said housing being hermetically sealed with respect to said support; a control permanent magnet disposed in spaced relationship to said second pointed ends of said actuating magnet, opposite magnetic poles of said magnets being disposed generally adjacent each other; and float operated means for moving said control magnet along a path disposed rotated substantially ninety degrees to said axis of said actuating magnet, whereby to pivot said actuating magnet through effect of magnetic flux between said magnets, and substantially simultaneously to move said switch member by magnetic attraction through said end portions to effect bridging or breaking of said contacts thereby.

References Cited in the file of this patent

UNITED STATES PATENTS

| | | |
|---|---|---|
| 817,555 | Hartmann-Kempf | Apr. 10, 1906 |
| 2,062,674 | Pirwitz | Dec. 1, 1936 |
| 2,204,161 | Shepherd | June 11, 1940 |
| 2,577,165 | Thorsheim | Dec. 4, 1951 |
| 2,600,011 | MacDonald et al. | June 10, 1952 |
| 2,658,970 | Hurley | Nov. 10, 1952 |
| 2,671,834 | Kmiecik | Mar. 9, 1954 |
| 2,711,454 | Opuszenski | June 21, 1955 |
| 2,725,439 | Newboult | Nov. 29, 1955 |
| 2,770,697 | Kellett | Nov. 13, 1956 |